(12) United States Patent
Arimilli et al.

(10) Patent No.: US 8,521,895 B2
(45) Date of Patent: Aug. 27, 2013

(54) MANAGEMENT OF APPLICATION TO APPLICATION COMMUNICATION REQUESTS BETWEEN DATA PROCESSING SYSTEMS

(75) Inventors: Ravi K. Arimilli, Austin, TX (US); Piyush Chaudhary, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/342,834

(22) Filed: Dec. 23, 2008

(65) Prior Publication Data
US 2010/0161705 A1    Jun. 24, 2010

(51) Int. Cl.
*G06F 15/16* (2006.01)
(52) U.S. Cl.
USPC ............................................. 709/230
(58) Field of Classification Search
USPC ................................. 709/230; 717/118, 141
See application file for complete search history.

(56) References Cited

U.S. PATENT DOCUMENTS

| | | | |
|---|---|---|---|
| 5,371,890 A * | 12/1994 | Bozman et al. | 719/312 |
| 5,541,914 A | 7/1996 | Krishnamoorthy et al. | |
| 5,764,895 A | 6/1998 | Chung | |
| 5,819,026 A | 10/1998 | Lhotak et al. | |
| 5,918,067 A * | 6/1999 | Kamei et al. | 710/5 |
| 6,061,739 A | 5/2000 | Reed et al. | |
| 6,373,841 B1 | 4/2002 | Goh et al. | |
| 6,393,503 B2 | 5/2002 | Fishler et al. | |
| 6,584,535 B1 | 6/2003 | Ouellet et al. | |
| 6,631,447 B1 * | 10/2003 | Morioka et al. | 711/141 |
| 6,768,742 B1 | 7/2004 | Godfrey | |
| 6,917,987 B2 | 7/2005 | Parthasarathy et al. | |
| 6,975,628 B2 | 12/2005 | Johnson et al. | |
| 7,103,888 B1 * | 9/2006 | Cayton et al. | 719/313 |
| 7,126,947 B2 | 10/2006 | Kalkunte et al. | |
| 7,197,553 B2 | 3/2007 | Roberts et al. | |
| 7,218,616 B2 | 5/2007 | Karim | |

(Continued)

FOREIGN PATENT DOCUMENTS

WO     WO2006/106475 A1     10/2006

OTHER PUBLICATIONS

Braun, Florian et al., "Layered Protocol Wrappers for Internet Packet Processing in Reconfigurable Hardware", Symposium on High Performance Interconnects, Aug. 2001, 5 pages.

(Continued)

*Primary Examiner* — Jerry Dennison
(74) *Attorney, Agent, or Firm* — Francis Lammes; Stephen J. Walder, Jr.; Libby Z. Toub

(57) ABSTRACT

A mechanism is provided for managing an application communication request. A first operating system passes a call from a first application in a first data processing system intended for a second application in a second data processing system to a first host fabric interface controller in the first data processing system without processing the call. The first host fabric interface processes the call using state information associated with the call to determine the second data processing system with which the call is associated. The first host fabric interface initiates a connection to a second host fabric interface in the second data processing system and transfers the call to a second operating system in the second data processing system via the connection to the second host fabric interface. The second data processing system then processes the call intended for the second application without assistance from the second application.

17 Claims, 8 Drawing Sheets

(56) References Cited

U.S. PATENT DOCUMENTS

| | | | |
|---|---|---|---|
| 7,236,987 | B1 | 6/2007 | Faulkner et al. |
| 7,290,168 | B1 | 10/2007 | DeKoning |
| 7,500,004 | B1* | 3/2009 | Homer .......................... 709/228 |
| 8,370,855 | B2 | 2/2013 | Arimilli et al. |
| 2003/0005144 | A1 | 1/2003 | Engel et al. |
| 2003/0208566 | A1 | 11/2003 | Weber et al. |
| 2004/0010612 | A1 | 1/2004 | Pandya |
| 2004/0088522 | A1 | 5/2004 | Watson et al. |
| 2004/0143648 | A1 | 7/2004 | Koning et al. |
| 2004/0199514 | A1 | 10/2004 | Rosenblatt et al. |
| 2007/0101016 | A1 | 5/2007 | Boyd et al. |
| 2007/0294074 | A1 | 12/2007 | Ciolfi |
| 2008/0196041 | A1* | 8/2008 | Gregg et al. .................. 719/318 |
| 2009/0135739 | A1 | 5/2009 | Hoover et al. |
| 2010/0161704 | A1 | 6/2010 | Arimilli et al. |
| 2010/0162271 | A1 | 6/2010 | Arimilli et al. |
| 2010/0162272 | A1 | 6/2010 | Arimilli et al. |

OTHER PUBLICATIONS

Liu, Jian et al., "System Level Interconnect Design for Network-on-Chip Using Interconnect IPs", Proceedings of the 2003 international workshop on System-level interconnect prediction, SLIP 03, Apr. 2003, pp. 117-124.
Sgroi, M et al., "Addressing the System-on-a-Chip Interconnect Woes Through Communication-Based Design", 38th Conference on Design Automation, DAC 2001, Jun. 18-22, 2001, pp. 667-672.
U.S. Appl. No. 12/342,559, 1 page.
U.S. Appl. No. 12/342,616, 1 page.
U.S. Appl. No. 12/342,691, 1 page.
U.S. Appl. No. 12/342,881, 1 page.
Interview Summary mailed Jan. 7, 2011, U.S. Appl. No. 12/342,691, 4 pages.
Response to Office Action filed Jan. 6, 2011, U.S. Appl. No. 12/342,691, 17 pages.
Final Office Action mailed Apr. 4, 2011 for U.S. Appl. No. 12/342,691; 27 pages.
Advisory Action mailed Jun. 16, 2011 for U.S. Appl. No. 12/342,691; 4 pages.
Appellants' Brief filed with the USPTO on Aug. 1, 2011 for U.S. Appl. No. 12/342,691; 23 pages.
Response to Final Office Action filed with the USPTO on Jun. 7, 2011 for U.S. Appl. No. 12/342,691; 8 pages.
Examiner's Answer mailed Nov. 9, 2011 for U.S. Appl. No. 12/342,691; 28 pages.
Examiner's Answer mailed Nov. 23, 2011 for U.S. Appl. No. 12/342,691; 29 pages.
Interview Summary mailed Dec. 16, 2011 for U.S. Appl. No. 12/342,691; 3 pages.
Office Action mailed Nov. 22, 2011 for U.S. Appl. No. 12/342,881; 23 pages.
Reply Brief filed Jan. 23, 2012 for U.S. Appl. No. 12/342,691; 11 pages.
Final Office Action mailed May 16, 2012 for U.S. Appl. No. 12/342,881; 26 pages.
Interview Summary mailed Feb. 23, 2012 for U.S. Appl. No. 12/342,881; 3 pages.
Office Action mailed May 4, 2012 for U.S. Appl. No. 12/342,616, 40 pages.
Response to Office Action filed Feb. 22, 2012, U.S. Appl. No. 12/342,881, 22 pages.
U.S. Appl. No. 13/444,276, 1 page.
Hossain, Hemayet et al., "Extended-Butterfly Fat Tree Interconnection (EFTI) Architecture for Network on Chip", IEEE, Aug. 24, 2005, pp. 613-616.
Interview Summary mailed Jun. 25, 2012 for U.S. Appl. No. 12/342,881; 3 pages.
Interview Summary mailed Aug. 9, 2012 for U.S. Appl. No. 12/342,616, 3 pages.
Office Action mailed Jun. 27, 2012 for U.S. Appl. No. 12/342,559; 26 pages.
Response to Final Office Action filed Jul. 25, 2012, U.S. Appl. No. 12/342,881, 13 pages.
Response to Office Action filed Aug. 3, 2012, U.S. Appl. No. 12/342,616, 24 pages.
Barker, Kevin J. et al., "On the Feasibility of Optical Circuit Switching for High Performance Computing Systems", SC/05, ftp://130.49.220.34/web/projects/percs/papers/OCS_final.pdf, Seattle, Washington, Nov. 12-18, 2005, 22 pages.
Hadzic, Ilija et al., "Balancing Performance and Flexibility with Hardware Support for Network Architectures", ACM Transactions on Computer Systems, vol. 21, No. 4, Nov. 2003, pp. 375-411.
Jun, Hong-Shin et al., "Removing JTAG Bottlenecks in System Interconnect Test", International Test Conference 2004(ITC'04), pp. 173-180.
Lu, Tainchi et al., "Supporting Large-Scale Distributed Simulation Using HLA", ACM Transactions on Modeling and Computer Simulation, vol. 10, No. 3, Jul. 2000, pp. 268-294.
Olukotun, Kunle et al., "Digital System Simulation: Methodologies and Examples", DAC98, San Francisco, California, Jun. 15-19, 1998, pp. 658-663.
Steenkiste, Peter, "A High-Speed Network Interface for Distributed-Memory Systems: Architecture and Applications", ACM Transactions on Computer Systems, vol. 15, No. 1, Feb. 1997, pp. 75-109.
Taylor, David E. et al., "ClassBench: A Packet Classification Benchmark", IEEE/ACM Transactions on Networking, vol. 15, No. 3, Jun. 2007, pp. 499-511.
Yin, Jian et al., "Separating Agreement from Execution for Byzantine Fault Tolerant Services", ACM, SOSP'03, Bolton Landing, New York, Oct. 19-22, 2003, pp. 253-267.
Zhang, Xiao-Jun et al., "HTTP redirection applied to gateway authentication", Journal of Dalian University of Technology, vol. 45, Supp. S48-S51, Oct. 2005, Abstract only, 1 page.
Interview Summary mailed Oct. 9, 2012 for U.S. Appl. No. 12/342,559; 3 pages.
Notice of Allowance mailed Sep. 26, 2012 for U.S. Appl. No. 12/342,616; 20 pages.
Response to Office Action filed with the USPTO on Sep. 27, 2012 for U.S. Appl. No. 12/342,559, 18 pages.
Final Office Action dated Jan. 24, 2013 for U.S. Appl. No. 12/342,559, 24 pages.
Notice of Allowance mailed Apr. 1, 2013 for U.S. Appl. No. 12/342,559, 13 pages.
Response to Final Office Action filed with the USPTO on Mar. 19, 2013 for U.S. Appl. No. 12/342,559, 6 pages.

* cited by examiner

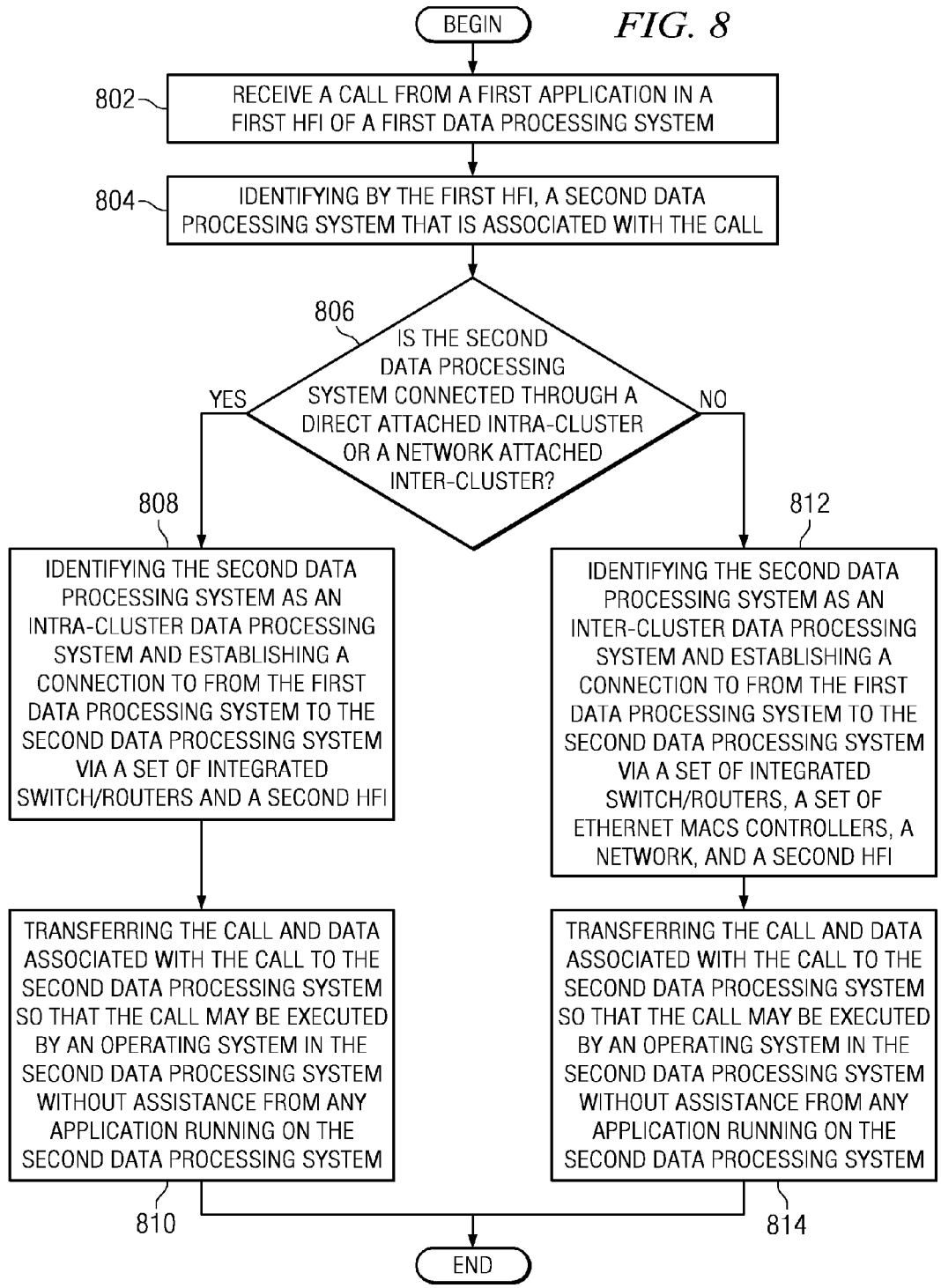

US 8,521,895 B2

MANAGEMENT OF APPLICATION TO APPLICATION COMMUNICATION REQUESTS BETWEEN DATA PROCESSING SYSTEMS

This invention was made with United States Government support under Agreement No. HR0011-07-9-0002 awarded by DARPA. The Government has certain rights in the invention.

BACKGROUND

The present application relates generally to an improved data processing system and method. More specifically, the present application is directed to intra-cluster management of process-to-process communication requests.

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband and RapidIO®), TCP offload engines, and zero-copy data transfer techniques (e.g., remote direct memory access). Efforts have also been increasingly focused on improving the speed of host-to-host communications within multi-host systems. Such improvements have been achieved in part through the use of high-speed network and network switch fabric technologies.

SUMMARY

In one illustrative embodiment, a mechanism is provided for managing an application communication request. The illustrative embodiment receives a call in a first operating system from a first application in a first data processing system in the plurality of data processing systems intended for a second application in a second data processing system. The illustrative embodiment passes, by the first operating system, the call from the first operating system to a first host fabric interface controller in the first data processing system without processing the call. The illustrative embodiment processes the call, by the first host fabric interface, using state information associated with the call to determine the second data processing system in the plurality of data processing systems with which the call is associated. In the illustrative embodiment, the call is processed by the first host fabric interface without intervention by the first operating system. The illustrative embodiment initiates, by the first host fabric interface, a connection to a second host fabric interface in the second data processing system. The illustrative embodiment transfers the call to a second operating system associated with the second application in the second data processing system via the connection to the second host fabric interface. The illustrative embodiment processes, by the second data processing system, the call intended for the second application without assistance from the second application running on the second data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8 depicts the operation performed by a host fabric interface (HFI) robust controller in accordance with an illustrative embodiment.

DETAILED DESCRIPTION

Figure 1:
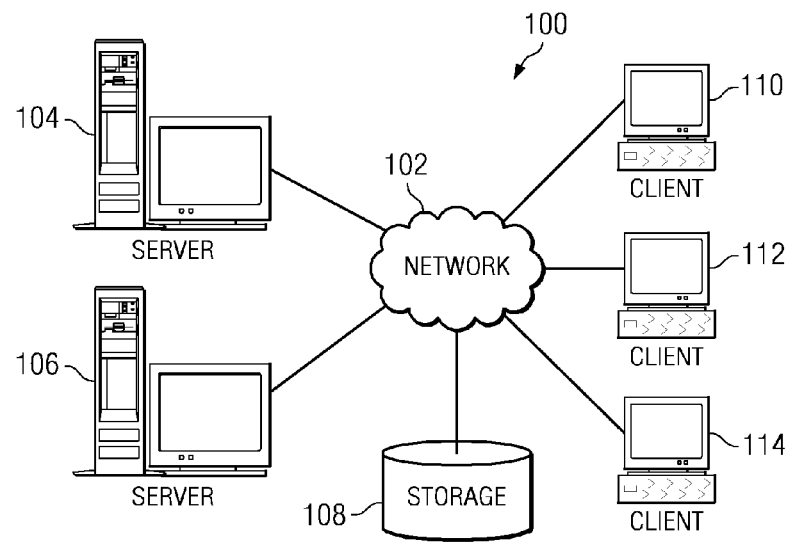
FIG. 1 is an exemplary representation of an exemplary distributed data processing system in which aspects of the illustrative embodiments may be implemented.

The illustrative embodiments provide mechanisms for intra-cluster and inter-cluster management of process-to-process communication requests between data processing systems. The illustrative embodiments provide for establishing an intra-cluster or inter-cluster connection between two data processing systems using robust host fabric interface (HFI) controllers. The HFI in a first data processing system receives a call from an application that is directed to a second data processing system. The HFI uses state information associated with the call to identify the second data processing system as either a direct attached intra-cluster or a network attached inter-cluster and establishes a connection with an HFI of the second data processing system through a set of integrated switch/routers and another HFI, or a set of integrated switch/routers, network interface controllers, a network, and another HFI. Once the connection is established, the HFI of the first data processing system is able to transfer data to the second data processing system for use by the second data processing system.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
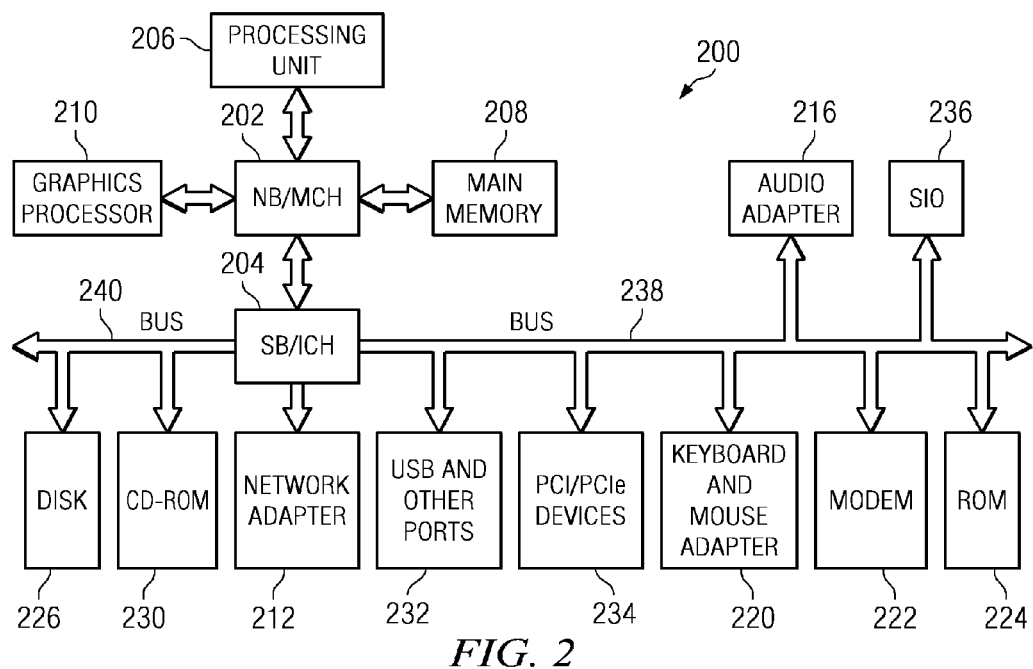
FIG. 2 is a block diagram of an exemplary data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of an intra-cluster and inter-cluster management mechanism for process-to-process communication requests between data processing systems, this is only an example and is not intended to state or imply any limitation with regard to the features of the present invention. To the contrary, the illustrative embodiments are intended to include distributed data processing environments and embodiments in which process-to-process communication requests may be managed between data processing systems by an intra-cluster and inter-cluster management mechanism.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices or computing resources, server computing devices or computing resources, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a highly-configurable, scalable system that integrates computing, storage, networking, and software. The illustrative embodiments provide mechanisms for acceleration in intra-cluster and inter-cluster management of process-to-process communication requests. The illustrative embodiments establish an intra-cluster or inter-cluster connection between two data processing systems using robust host fabric interface (HFI) controllers. The HFI in a first data processing system receives a call from an application that is directed to a second data processing system. The HFI uses state information associated with the call to identify the second data processing system as either a direct attached intra-cluster or a network attached inter-cluster and establishes a connection with an HFI of the second data processing system through a set of integrated switch/routers and another HFI, or a set of integrated switch/routers, network interface controllers, a network, and another HFI. Once the connection is established, the HFI of the first data processing system is able to transfer data to the second data processing system for use by the second data processing system.

Figure 3:
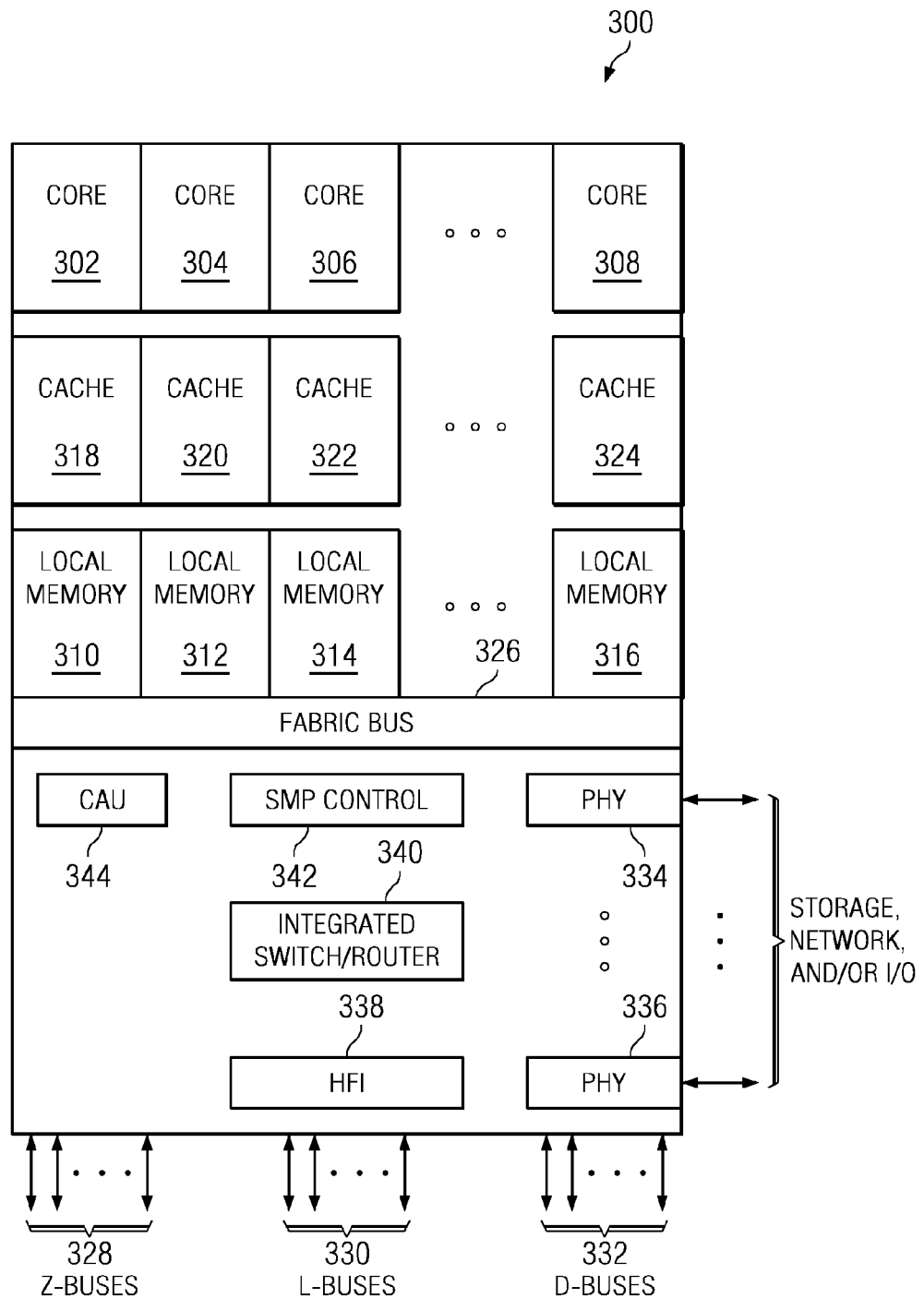
FIG. 3 depicts an exemplary logical view of a processor chip, which may be a "node" in the multi-tiered full-graph interconnect architecture, in accordance with one illustrative embodiment.

FIG. 3 depicts an exemplary logical view of a processor chip, which may be a "node" in the multi-tiered full-graph interconnect architecture, in accordance with one illustrative embodiment. Processor chip 300 may be a processor chip such as processing unit 206 of FIG. 2. Processor chip 300 may be logically separated into the following functional components: homogeneous processor cores 302, 304, 306, and 308, and local memory 310, 312, 314, and 316. Although processor cores 302, 304, 306, and 308 and local memory 310, 312, 314, and 316 are shown by example, any type and number of processor cores and local memory may be supported in processor chip 300.

Processor chip 300 may be a system-on-a-chip such that each of the elements depicted in FIG. 3 may be provided on a single microprocessor chip. Moreover, in an alternative embodiment processor chip 300 may be a heterogeneous processing environment in which each of processor cores 302, 304, 306, and 308 may execute different instructions from each of the other processor cores in the system. Moreover, the instruction set for processor cores 302, 304, 306, and 308 may be different from other processor cores, that is, one processor core may execute Reduced Instruction Set Computer (RISC) based instructions while other processor cores execute vectorized instructions. Each of processor cores 302, 304, 306, and 308 in processor chip 300 may also include an associated one of cache 318, 320, 322, or 324 for core storage.

Processor chip 300 may also include an integrated interconnect system indicated as Z-buses 328, L-buses 330, and D-buses 332. Z-buses 328, L-buses 330, and D-buses 332 provide interconnection to other processor chips in a three-tier complete graph structure, which will be described in detail below. The integrated switching and routing provided by interconnecting processor chips using Z-buses 328, L-buses 330, and D-buses 332 allow for network communications to devices using communication protocols, such as a message passing interface (MPI) or an internet protocol (IP), or using communication paradigms, such as global shared memory, to devices, such as storage, and the like.

Additionally, processor chip 300 implements fabric bus 326 and other I/O structures to facilitate on-chip as well as external data flow to a network, such as network 102 of FIG. 1. Fabric bus 326 serves as the primary on-chip bus for processor cores 302, 304, 306, and 308. In addition, fabric bus 326 interfaces to other on-chip interface controllers that are dedicated to off-chip accesses. The on-chip interface controllers may be physical interface macros (PHYs) 334 and 336 that support multiple high-bandwidth interfaces, such as PCIx, Ethernet, memory, storage, and the like. Although PHYs 334 and 336 are shown by example, any type and number of PHYs may be supported in processor chip 300. The specific interface provided by PHY 334 or 336 is selectable, where the other interfaces provided by PHY 334 or 336 are disabled once the specific interface is selected.

Processor chip 300 may also include host fabric interface (HFI) 338 and integrated switch/router (ISR) 340. HFI 338 and ISR 340 comprise a high-performance communication subsystem for an interconnect network, such as network 102 of FIG. 1. Integrating HFI 338 and ISR 340 into processor chip 300 may significantly reduce communication latency and improve performance of parallel applications by drastically reducing adapter overhead. Alternatively, due to various chip integration considerations (such as space and area constraints), HFI 338 and ISR 340 may be located on a separate chip that is connected to the processor chip. HFI 338 and ISR 340 may also be shared by multiple processor chips, permitting a lower cost implementation. Processor chip 300 may also include symmetric multiprocessing (SMP) control 342 and collective acceleration unit (CAU) 344. Alternatively, these SMP control 342 and CAU 344 may also be located on a separate chip that is connected to processor chip 300. SMP control 342 may provide fast performance by making multiple cores available to complete individual processes simultaneously, also known as multiprocessing. Unlike asymmetrical processing, SMP control 342 may assign any idle processor core 302, 304, 306, or 308 to any task and add additional ones of processor core 302, 304, 306, or 308 to improve performance and handle increased loads. CAU 344 controls the implementation of collective operations (collectives), which may encompass a wide range of possible algorithms, topologies, methods, and the like.

HFI 338 acts as the gateway to the interconnect network. In particular, processor core 302, 304, 306, or 308 may access HFI 338 over fabric bus 326 and request HFI 338 to send messages over the interconnect network. HFI 338 composes the message into packets that may be sent over the interconnect network, by adding routing header and other information to the packets. ISR 340 acts as a router in the interconnect network. ISR 340 performs three functions: ISR 340 accepts network packets from HFI 338 that are bound to other destinations, ISR 340 provides HFI 338 with network packets that are bound to be processed by one of processor cores 302, 304, 306, and 308, and ISR 340 routes packets from any of Z-buses 328, L-buses 330, or D-buses 332 to any of Z-buses 328, L-buses 330, or D-buses 332. CAU 344 improves the system performance and the performance of collective operations by carrying out collective operations within the interconnect network, as collective communication packets are sent through the interconnect network. More details on each of these units will be provided further along in this application.

By directly connecting HFI 338 to fabric bus 326, by performing routing operations in an integrated manner through ISR 340, and by accelerating collective operations through CAU 344, processor chip 300 eliminates much of the interconnect protocol overheads and provides applications with improved efficiency, bandwidth, and latency.

It should be appreciated that processor chip 300 shown in FIG. 3 is only exemplary of a processor chip which may be used with the architecture and mechanisms of the illustrative embodiment. Those of ordinary skill in the art are well aware that there are a plethora of different processor chip designs currently available, all of which cannot be detailed herein. Suffice it to say that the mechanisms of the illustrative embodiment are not limited to any one type of processor chip design or arrangement and the illustrative embodiment may be used with any processor chip currently available or which may be developed in the future. FIG. 3 is not intended to be limiting of the scope of the illustrative embodiment but is only provided as exemplary of one type of processor chip that may be used with the mechanisms of the illustrative embodiment.

As mentioned above, in accordance with the illustrative embodiment, the host fabric interface (HFI) acts as the gateway to the interconnect network. In particular, processor cores may access the HFI over a fabric bus and request the HFI to send messages over the interconnect network. The HFI composes the message into packets that may be sent over the interconnect network, by adding routing header and other information to the packets. The HFI improves over other systems by eliminating the need for the operating system to perform all of the process-to-process communication abstractions.

Figure 4A:
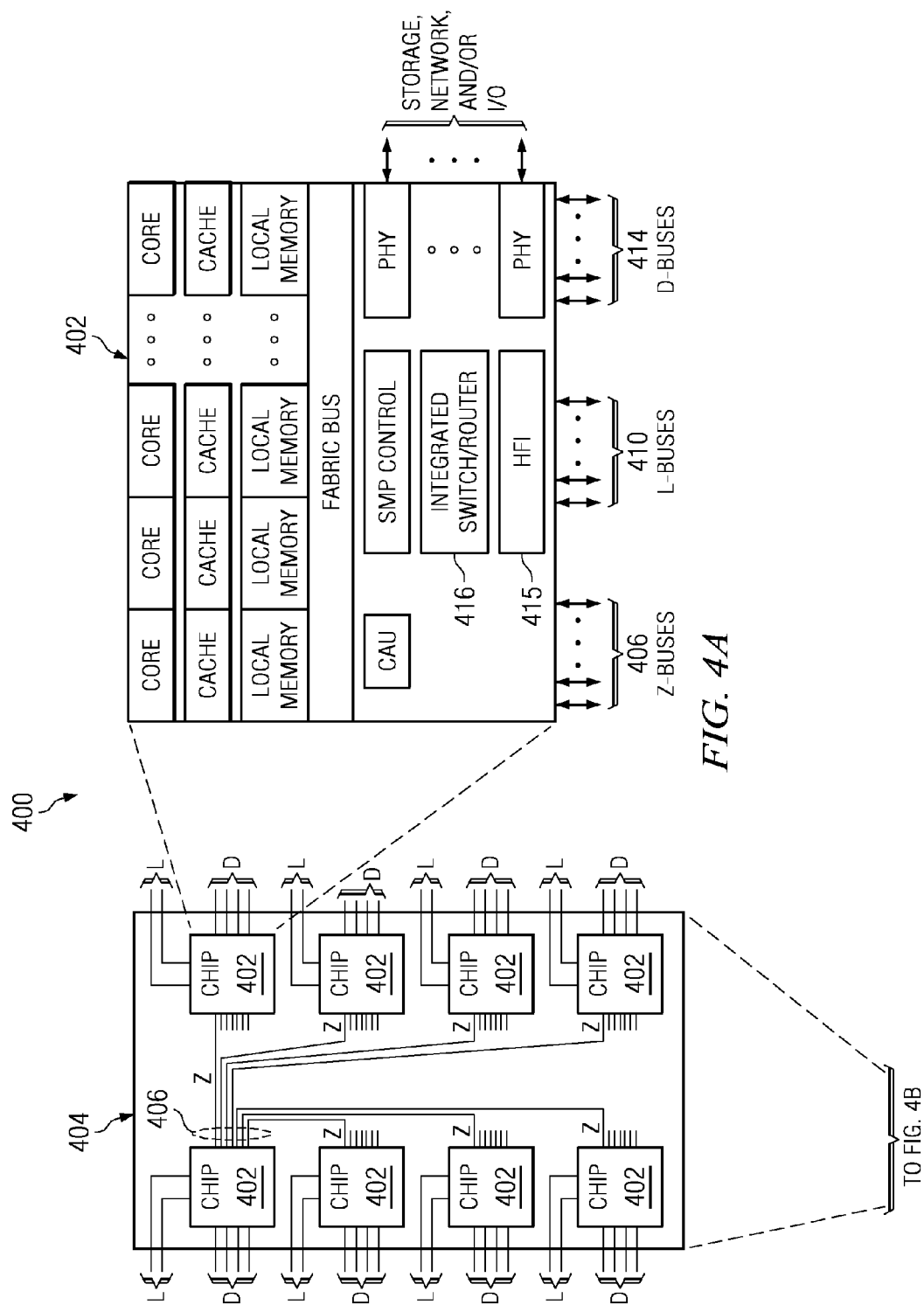
FIGS. 4A and 4B depict an example of such a multi-tiered full-graph interconnect architecture in accordance with one illustrative embodiment.
Figure 4B:
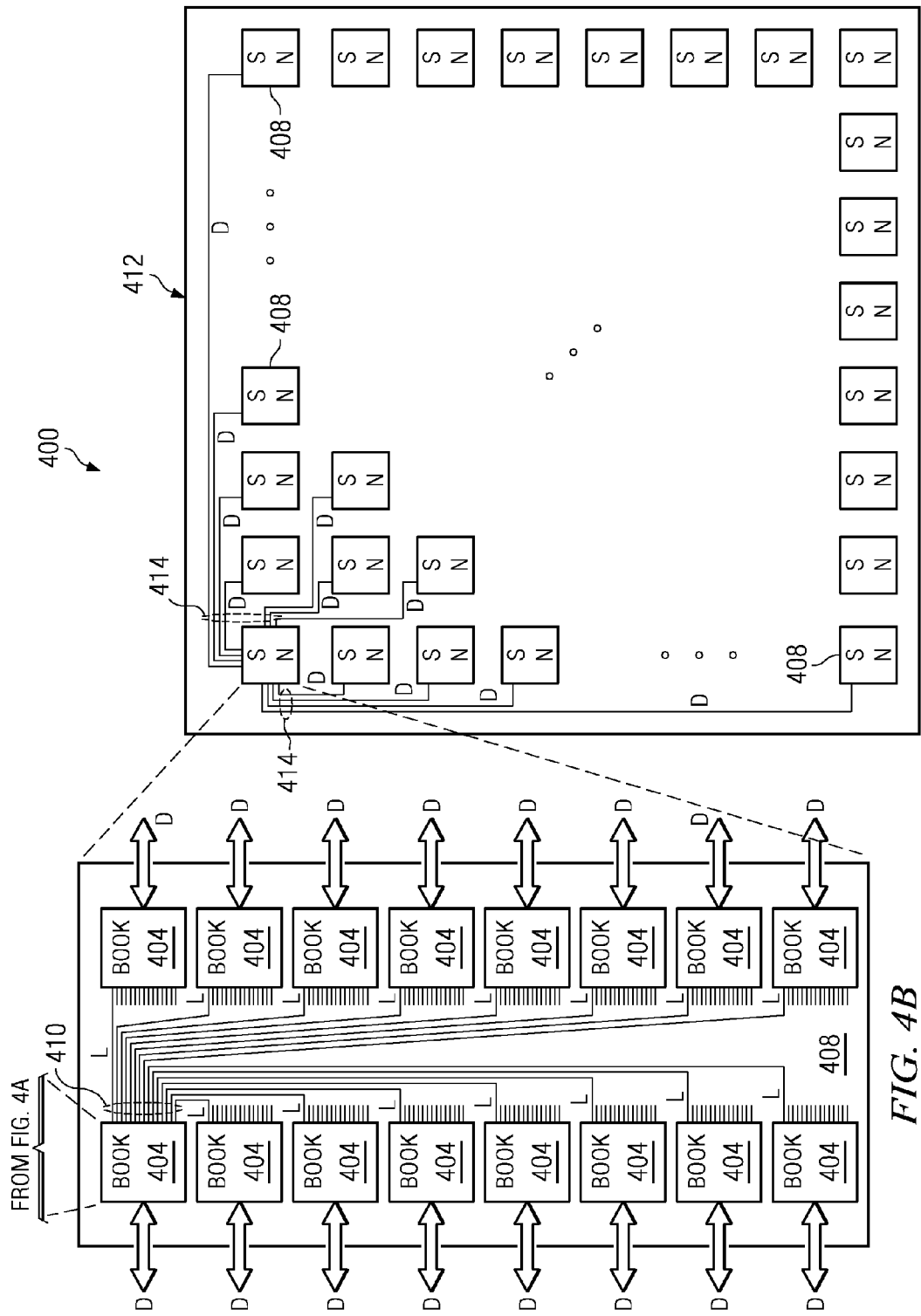

FIGS. 4A and 4B depict an example of such a multi-tiered full-graph interconnect architecture in accordance with one illustrative embodiment. In a data communication topology 400, processor chips 402, which again may each be a processor chip 300 of FIG. 3, for example, is the main building block. In this example, a plurality of processor chips 402 may be used and provided with local direct communication links to create processor book 404. In the depicted example, eight processor chips 402 are combined into processor book 404, although this is only exemplary and other numbers of processor chips, including only one processor chip, may be used to designate a processor book without departing from the spirit and scope of the present invention. For example, any power of 2 number of processor chips may be used to designate a processor book. In the context of the present invention, a "direct" communication connection or link means that the particular element, e.g., a processor chip, may communicate data with another element without having to pass through an intermediary element. Thus, an "indirect" communication connection or link means that the data is passed through at least one intermediary element before reaching a destination element.

In processor book 404, each of the eight processor chips 402 may be directly connected to the other seven processor chips 402 via a bus, herein referred to as "Z-buses" 406 for identification purposes. FIG. 4A indicates unidirectional Z-buses 406 connecting from only one of processor chips 402 for simplicity. However, it should be appreciated that Z-buses 406 may be bidirectional and that each of processor chips 402 may have Z-buses 406 connecting them to each of the other processor chips 402 within the same processor book. Each of Z-buses 406 may operate in a base mode where the bus operates as a network interface bus, or as a cache coherent symmetric multiprocessing (SMP) bus enabling processor book 404 to operate as a 64-way (8 chips/book×8-way/chip) SMP node. The terms "8-way," "64-way", and the like, refer to the number of communication pathways a particular element has with other elements. Thus, an 8-way processor chip has 8 communication connections with other processor chips. A 64-way processor book has 8 processor chips that each have 8 communication connections and thus, there are 8×8 communication pathways. It should be appreciated that this is only exemplary and that other modes of operation for Z-buses 406 may be used without departing from the spirit and scope of the present invention.

As depicted, a plurality of processor books 404, e.g., sixteen in the depicted example, may be used to create supernode (SN) 408. In the depicted SN 408, each of the sixteen processor books 404 may be directly connected to the other fifteen processor books 404 via buses, which are referred to herein as "L-buses" 410 for identification purposes. FIG. 4B indicates unidirectional L-buses 410 connecting from only one of processor books 404 for simplicity. However, it should be appreciated that L-buses 410 may be bidirectional and that each of processor books 404 may have L-buses 410 connecting them to each of the other processor books 404 within the same supernode. L-buses 410 may be configured such that they are not cache coherent, i.e. L-buses 410 may not be configured to implement mechanisms for maintaining the coherency, or consistency, of caches associated with processor books 404.

It should be appreciated that, depending on the symmetric multiprocessor (SMP) configuration selected, SN 408 may have various SMP communication connections with other SNs. For example, in one illustrative embodiment, the SMP configuration may be set to either be a collection of 128 8-way SMP supernodes (SNs) or 16 64-way SMP supernodes. Other SMP configurations may be used without departing from the spirit and scope of the present invention.

In addition to the above, in the depicted example, a plurality of SNs 408 may be used to create multi-tiered full-graph (MTFG) interconnect architecture network 412. In the depicted example, 512 SNs are connected via external communication connections (the term "external" referring to communication connections that are not within a collection of elements but between collections of elements) to generate MTFG interconnect architecture network 412. While 512 SNs are depicted, it should be appreciated that other numbers of SNs may be provided with communication connections between each other to generate a MTFG without departing from the spirit and scope of the present invention.

In MTFG interconnect architecture network 412, each of the 512 SNs 408 may be directly connected to the other 511 SNs 408 via buses, referred to herein as "D-buses" 414 for identification purposes. FIG. 4B indicates unidirectional D-buses 414 connecting from only one of SNs 408 for simplicity. However, it should be appreciated that D-buses 414 may be bidirectional and that each of SNs 408 may have D-buses 414 connecting them to each of the other SNs 408 within the same MTFG interconnect architecture network 412. D-buses 414, like L-buses 410, may be configured such that they are not cache coherent.

Again, while the depicted example uses eight processor chips 402 per processor book 404, sixteen processor books 404 per SN 408, and 512 SNs 408 per MTFG interconnect architecture network 412, the illustrative embodiment recognizes that a processor book may again contain other numbers of processor chips, a supernode may contain other numbers of processor books, and a MTFG interconnect architecture network may contain other numbers of supernodes. Furthermore, while the depicted example considers only Z-buses 406 as being cache coherent, the illustrative embodiment recognizes that L-buses 410 and D-buses 414 may also be cache coherent without departing from the spirit and scope of the present invention. Furthermore, Z-buses 406 may also be non cache-coherent. Yet again, while the depicted example shows a three-level multi-tiered full-graph interconnect, the illustrative embodiment recognizes that multi-tiered full-graph interconnects with different numbers of levels are also possible without departing from the spirit and scope of the present invention. In particular, the number of tiers in the MTFG interconnect architecture could be as few as one or as many as may be implemented. Thus, any number of buses may be used with the mechanisms of the illustrative embodiment. That is, the illustrative embodiment is not limited to requiring Z-buses, D-buses, and L-buses. For example, in an illustrative embodiment, each processor book may be comprised of a single processor chip, thus, only L-buses and D-buses are utilized. The example shown in FIGS. 4A and 4B is only for illustrative purposes and is not intended to state or imply any limitation with regard to the numbers or arrangement of elements other than the general organization of processors into processor books, processor books into supernodes, and supernodes into a MTFG interconnect architecture network.

Taking the above described connection of processor chips 402, processor books 404, and SNs 408 as exemplary of one illustrative embodiment, the interconnection of links between processor chips 402, processor books 404, and SNs 408 may be reduced by at least fifty percent when compared to externally connected networks, i.e. networks in which processors communicate with an external switch in order to communicate with each other, while still providing the same bisection of bandwidth for all communication. Bisection of bandwidth is defined as the minimum bi-directional bandwidths obtained when the multi-tiered full-graph interconnect is bisected in every way possible while maintaining an equal number of nodes in each half. That is, known systems, such as systems that use fat-tree switches, which are external to the processor chip, only provide one connection from a processor chip to the fat-tree switch. Therefore, the communication is limited to the bandwidth of that one connection. In the illustrative embodiment, one of processor chips 402 may use the entire bisection of bandwidth provided through HFI 415 and integrated switch/router (ISR) 416, which may be HFI 338 and ISR 340 of FIG. 3, for example, to either:

communicate to another processor chip 402 on a same processor book 404 where processor chip 402 resides via Z-buses 406,
communicate to another processor chip 402 on a different processor book 404 within a same SN 408 via L-buses 410, or
communicate to another processor chip 402 in another processor book 404 in another one of SNs 408 via D-buses 414.

That is, if a communicating parallel "job" being run by one of processor chips 402 hits a communication point, i.e. a point in the processing of a job where communication with another processor chip 402 is required, then processor chip 402 may use any of the processor chip's Z-buses 406, L-buses 410, or D-buses 414 to communicate with another processor as long as the bus is not currently occupied with transferring other data. Thus, by moving the switching capabilities inside the processor chip itself instead of using switches external to the processor chip, the communication bandwidth provided by the multi-tiered full-graph interconnect architecture of data communication topology 400 is made relatively large compared to known systems, such as the fat-tree switch based network which again, only provides a single communication link between the processor and an external switch complex.

Figure 5:
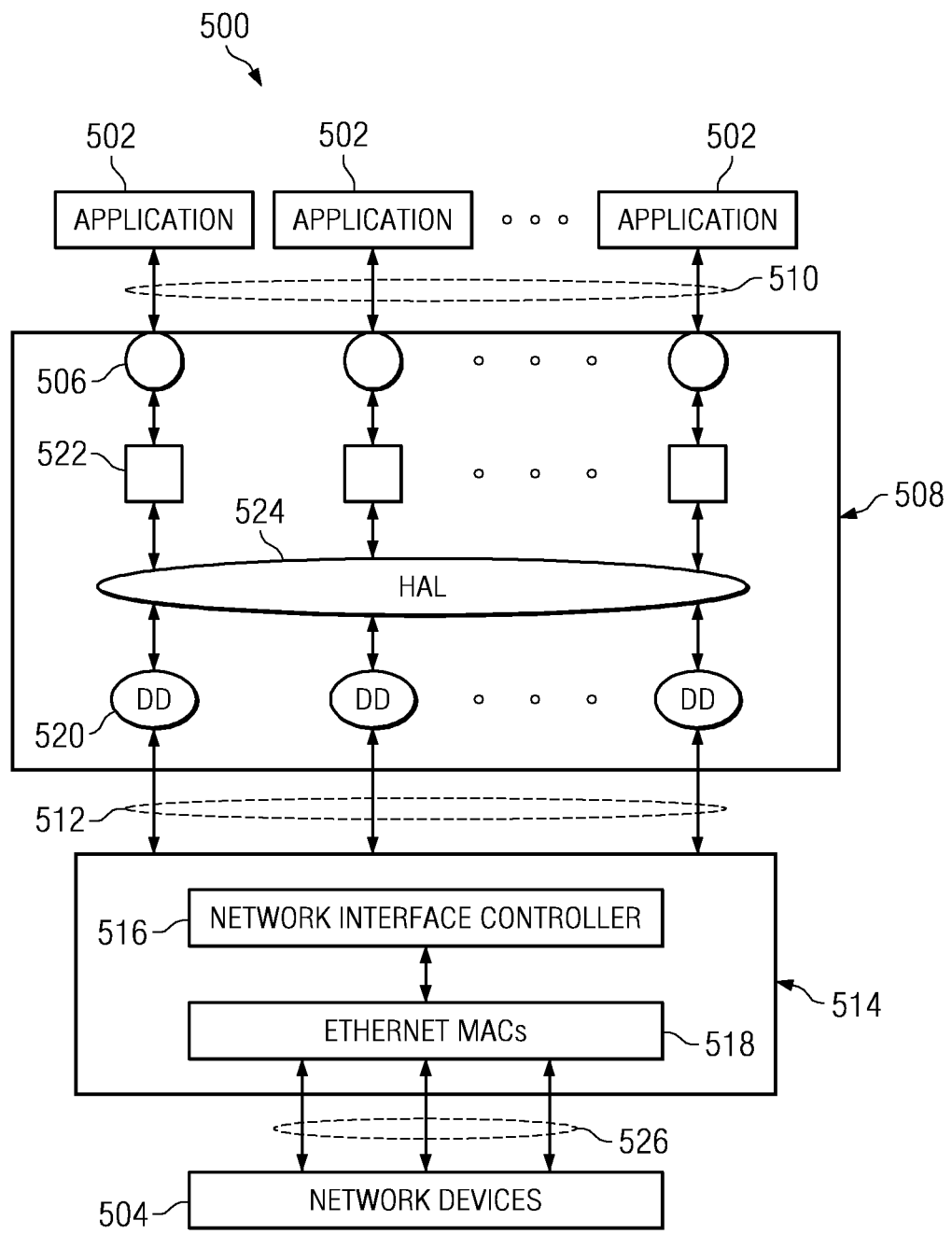
FIG. 5 illustrates a data processing system in which process-to-process communications are performed by an operating system in accordance with an illustrative embodiment.

FIG. 5 illustrates a data processing system in which process-to-process communications are performed by an operating system in accordance with an illustrative embodiment. In data processing system 500, when application 502 accesses one of network devices 504, application 502 may initiate one or more calls 506 to operating system 508 through sockets 510 using protocols, such as the Transmission Control Protocol over Internet Protocol (TCP/IP), User Datagram Protocol over Internet Protocol (UDP/IP), or the like. Operating system 508 may then access network devices 504 through programming interface 512 and network interface device 514. Network interface device 514 may be comprised of network interface controller 516 that accesses over connections 526 network devices 504 using protocols, such as BASE-T, Gigabit Ethernet (GbE or 1 GigE), or the like, through Ethernet Media Access Controls (MACs) 518, which are datagrams, protocols, and the like.

In data processing system 500, each of network devices 504 has a related specification provided by the manufacturer of the network device for which a unique device driver is built and added to device drivers 520 in operating system 508. For application 502 to access device driver 520 for network device 504, call 506 is processed by operating system 508 to identify state 522 for the particular socket 510 on which call 506 was received. Application 502 may have one or more associated sockets 510. However, each of sockets 510 has a specific one of states 522 associated with the particular socket 510. Once operating system 508 has identified state 522 associated with socket 510 on which call 506 was received, hardware abstraction layer (HAL) interface 524 abstracts or identifies device driver 520 that is associated with the identified state 522. Operating system 508 then uses the identified device driver 520 to access the network device 504 associated with call 506 from application 502.

Thus, for every call 506 made by application 502, operating system 508 executes a large number of instructions and uses a large amount of overhead to identify state 522 associated with socket 510, abstract device driver 520 associated with identified state 522 using HAL interface 524, and then uses the identified device driver 520 in order to access network device 504. The more instructions that are required to be executed by operating system 508 and the more overhead used by operating system 508 may have an adverse effect on the speed of operating system 508, thereby reducing the speed and efficiency of data processing system 500. For example, a 1 GigE operation performed by operating system 508 may take 100 milliseconds and a 10 GigE operation performed by operating system 508 may take 70 milliseconds.

Figure 6:
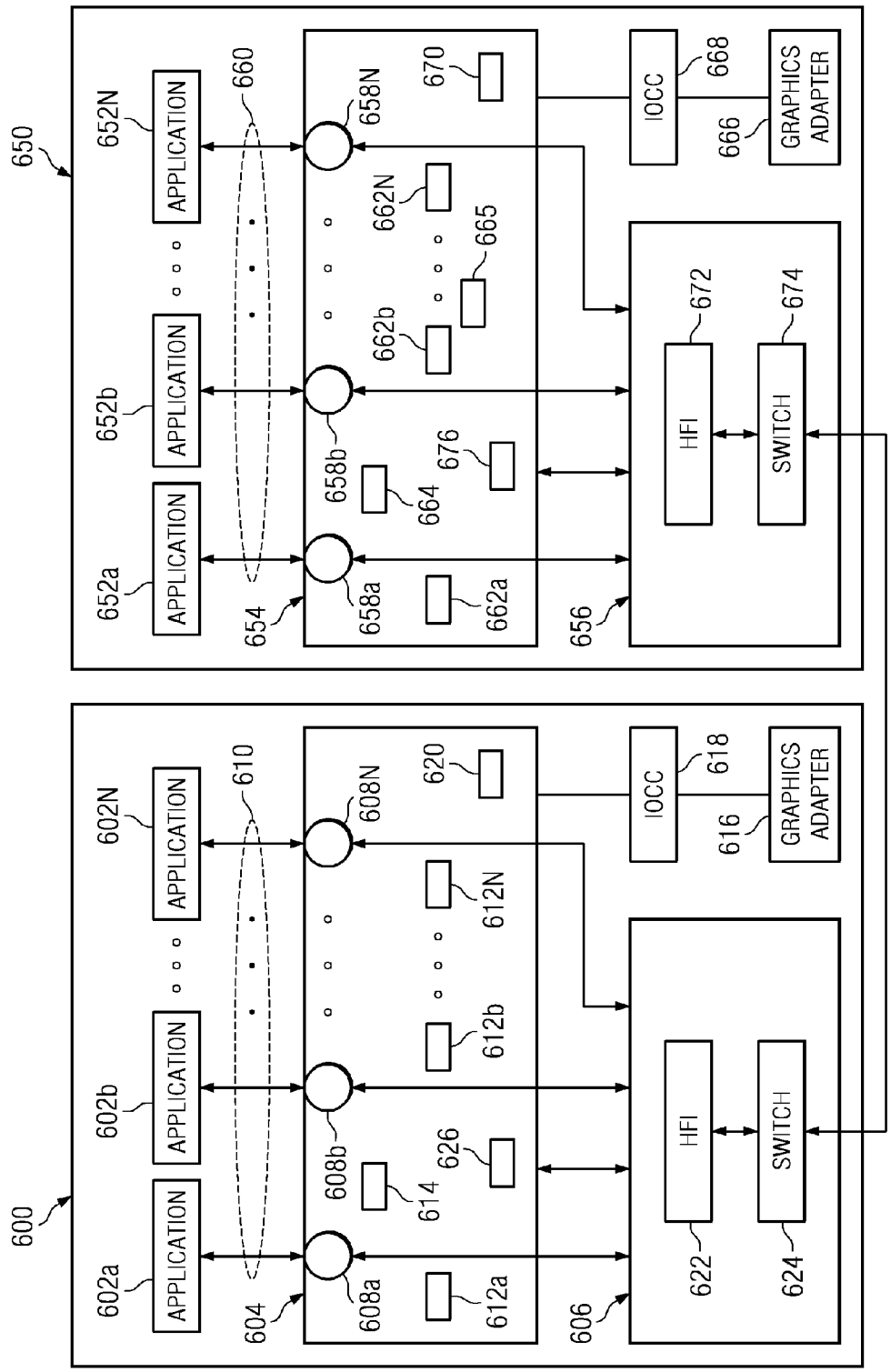
FIG. 6 illustrates a data processing system in which intra-cluster process-to-process communications are performed by a host fabric interface (HFI) in accordance with an illustrative embodiment.

FIG. 6 illustrates a data processing system in which intra-cluster process-to-process communications are performed by a host fabric interface (HFI) in accordance with an illustrative embodiment. Data processing system 600 may comprise applications 602a, 602b, through 602N, operating system 604, and HFI robust controller 606. In data processing system 600, when applications 602a, 602b, through 602N register with operating system 604, applications 602a, 602b, through 602N initiate calls 608a, 608b, and 608N to operating system 604 through sockets 610 using protocols, such as the Transmission Control Protocol over Internet Protocol (TCP/IP), User Datagram Protocol over Internet Protocol (UDP/IP), or the like. Operating system 604 may then allocate effective address (EA) spaces 612a, 612b, and 612N for use by applications 602a, 602b, through 602N. Also, when graphics adapter 616 connects to operating system 604 through input/output communication controller (IOCC) 618, operating system 604 allocates EA display buffer 620. While the illustrative embodiment only illustrates graphics adapter 616 coupled to IOCC 618, the illustrative embodiment recognizes that other input/output device may also be coupled to IOCC 618, such as printers, audio adapters, or the like, without departing from the spirit and scope of the invention.

The following description is described in terms of application 602a initiating calls; however, one of ordinary skill in the art would recognize that any one of applications 602a, 602b, through 602N could initiate a call. When application 602a initiates call 608a to communicate with application 602b, operating system 604 allocates shared EA space 614 that may be shared by application 602a and application 602b. When application 602a initiates call 608a to graphics adapter 616, operating system 604 transfers the data intended for graphics adapter 616 from EA space 612a to EA display buffer 620.

When application 602a in data processing system 600 initiates call 608a to communicate with graphics adapter 666 in data processing system 650, as opposed to the illustration in FIG. 4 where the operating system executes a large number of instructions and uses a large amount of overhead to identify the state associated with the socket, abstracts the device driver associated with the identified state using the HAL interface, and then uses the identified device driver in order to access the network device, operating system 604 allocates network communications buffer 626 to store the information to be communicated to graphics adapter 666 and passes call 608a directly to HFI robust controller 606 without any processing of call 608a by operating system 604. That is, operating system 604 does not execute a large number of instructions and use a large amount of overhead to identify the state associated with the socket, does not abstract the device driver associated with the identified state using the HAL interface, and does not use the identified device driver in order to access the network device. In FIG. 6, the statefullness associated with application 602a has been moved from operating system 604 to HFI robust controller 606. Thus, when application 602a makes call 608a to operating system 604, operating system 604 passes call 608a directly to HFI robust controller 606 without any processing of call 608a by operating system 604 based on state information associated with the call.

HFI robust controller 606 may comprise HFI 622 and integrated switch/router (ISR) 624. While the illustrative embodiment depicts HFI robust controller 606 as comprising HFI 622 and ISR 624, HFI 622 and ISR 624 may be separate components within data processing system, such as is shown in FIG. 3 by HFI 338 and integrated switch/router 340. HFI 622 and ISR 624 act as a gateway to other directly connected intra-cluster devices, such as data processing system 650. HFI 622 uses a state program to identify directly connected intra-cluster devices associated with call 608a or network attached inter-cluster devices and accesses the devices using derived state information. The intra-cluster connection is illustrated in FIGS. 4A and 4B when one of processor chips 402 may use the entire bisection of bandwidth provided through HFI 415 and integrated switch/router (ISR) 416, which may be HFI 338 and ISR 340 of FIG. 3, for example, to either:

communicate to another processor chip 402 on a same processor book 404 where processor chip 402 resides via Z-buses 406, communicate to another processor chip 402 on a different processor book 404 within a same SN 408 via L-buses 410, or communicate to another processor chip 402 in another processor book 404 in another one of SNs 408 via D-buses 414.

Figure 7:
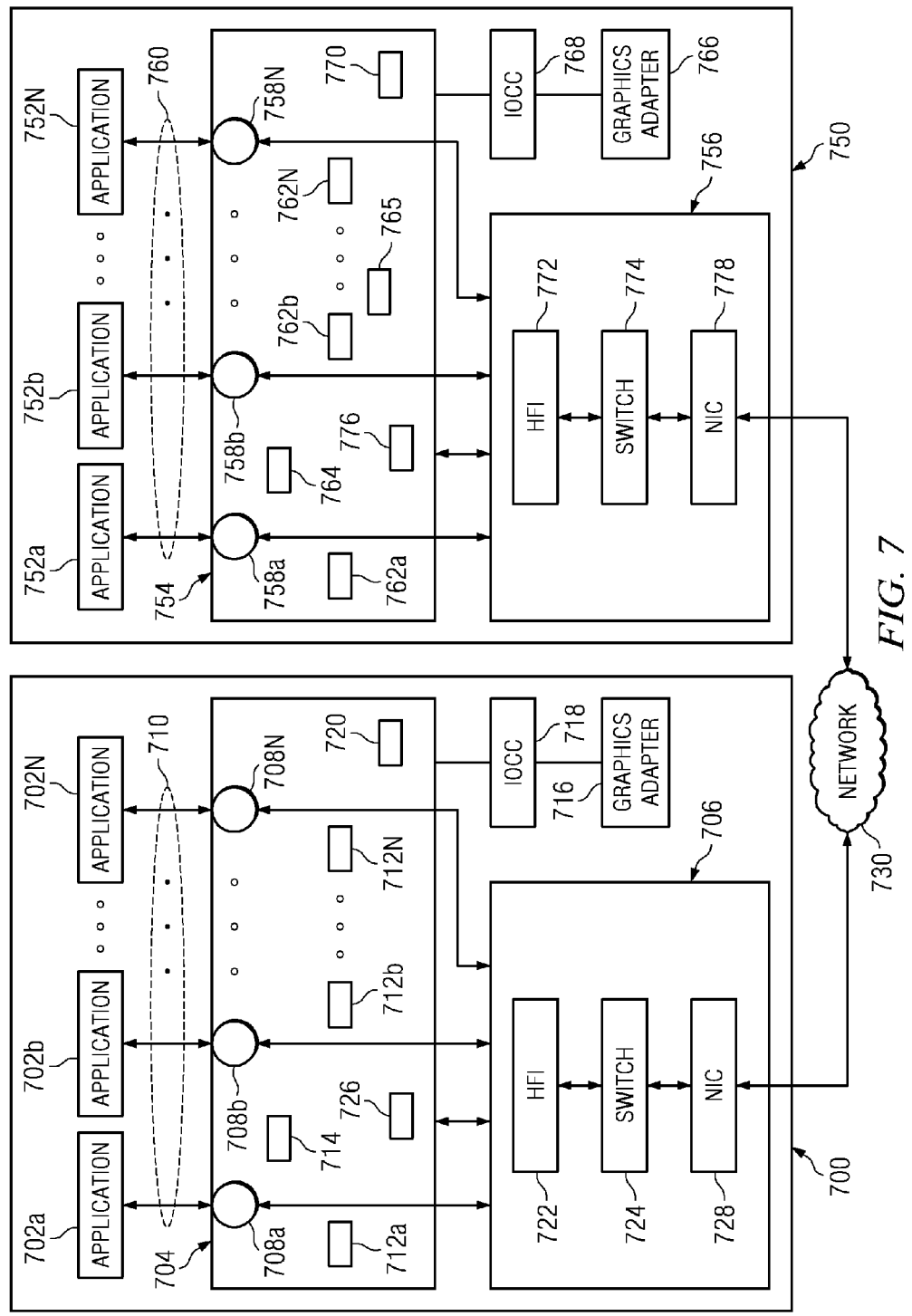
FIG. 7 illustrates a data processing system in which inter-cluster process-to-process communications are performed by a host fabric interface (HFI) in accordance with an illustrative embodiment.

Returning to FIG. 6, the state information stored by HFI 622 may particularly identify whether the intended directly connected intra-cluster device is connected to HFI robust controller 622 through a direct attached intra-cluster or a network attached inter-cluster which is described in FIG. 7. Using HFI 622 to identify state information associated with directly connected intra-cluster devices, such as data processing system 650, instead of operating system 604 performing the identification process increases the speed and efficiency of data processing system 600.

Data processing system 650 is similar to data processing system 600 in that data processing system 650 comprises applications 652a, 652b, through 652N, operating system 654, and HFI robust controller 656. As with data processing system 600, when applications 652a, 652b, through 652N in data processing system 650 register with operating system 654, applications 652a, 652b, through 652N initiate calls 658a, 658b, and 658N to operating system 654 through sockets 660 using similar protocols. Operating system 654 may then allocate effective address (EA) spaces 662a, 662b, and 662N for use by applications 652a, 652b, through 652N. Also, when graphics adapter 666 connects to operating system 654 through IOCC 668, operating system 654 allocates EA display buffer 670. While the illustrative embodiment only illustrates graphics adapter 666 coupled to IOCC 668, the illustrative embodiment recognizes that other input/output devices may also be coupled to IOCC 668, such as printers, speakers, or the like, without departing from the spirit and scope of the invention. Additionally, when application 652a initiates call 658a to communicate with application 652b, operating system 654 allocates shared EA space 664 that may be shared by application 652a and application 652b. When application 652a initiates call 658a to graphics adapter 666, operating system 604 transfers the data intended for graphics adapter 666 from EA space 662a to EA display buffer 670. Additionally, when application 652a initiates call 658a to another graphics adapter in another data processing system, operating system 654 allocates network communications buffer 676 to store the information to be communicated to the graphics adapter and passes call 658a directly to HFI robust controller 656 without any processing of call 658a by operating system 654.

Returning to call 608a issued by application 602a to graphics adapter 666. When application 602a initiates call 608a to communicate with graphics adapter 666, operating system 604 allocates network communications buffer 626 to store the information to be communicated to graphics adapter 666 and passes call 608a directly to HFI robust controller 606. HFI robust controller 606 identifies data processing system 650 as the data processing system that comprises graphics adapter 666. HFI 622 then initiates a connection to data processing system 650 through ISR 624 via one or more intra-cluster buses to ISR 674 and onto HFI 672. Once the HFI-to-HFI connection from HFI 622 to HFI 672 is established, HFI 622 transfers call 608a and the data from network communications buffer 626 to EA display buffer 670 so that call 608a may be executed by operating system 654 and the information may be displayed directly on graphics adapter 666. That is, the data associated with call 608a is displayed directly on graphics adapter 666 without any assistance from any application running on data processing system 650.

For example, if application 602a on data processing system 600 is an instant messaging application and a user wants to display a message on data processing system 650, current system would require the same instant messaging application to be running on data processing system 650. However, the illustrative embodiment does not require that the same instant messaging system be running on data processing system 650. In fact, as an example, data processing system 650 does not have any instant messaging applications whatsoever. Nonetheless, the illustrative embodiment allows HFI 622 to establish a connection to data processing system 650 through ISR 624 to ISR 674 and onto HFI 672. Once the HFI-to-HFI connection from HFI 622 to HFI 672 is established, HFI 622 transfers call 608*a* and the data, in this example an instant message, from network communications buffer 626 to EA display buffer 670 so that call 608*a* may be executed by operating system 654 and the instant message is displayed directly on graphics adapter 666 without any assistance from any application running on data processing system 650.

Further, if application 602*a* in data processing system 600 initiates call 608*a* to communicate with application 652N in data processing system 650, operating system 604 passes call 608*a* directly to HFI robust controller 606 without any processing of call 608*a* by operating system 604. Operating in a similar process to communicating with graphics adapter 666, HFI robust controller 606 identifies data processing system 650 as the data processing system that comprises application 652N and initiates a connection to data processing system 650 through ISR 624 to ISR 674 and onto HFI 672. At this point, HFI 672 in HFI robust controller 656 registers shared EA space 665 with operating system 654 with which to communicate with application 652N. Based on the registration request, operating system 654 allocates shared EA space 665 without any involvement by application 652N. This process is different from generally known application to application processes. That is, in generally known application to application processes, if application 602*a* wants to communicate with application 652N in a different data processing system, operating system 654 would require permission from application 652N prior to allocating shared EA space 665. However, in this illustrative embodiment, once the HFI-to-HFI connection from HFI 622 to HFI 672 is established, operating system 654 allocates shared EA space 665 without permission from application 652N and HFI 622 transfers call 608*a* and the data stored in network communications buffer 626 directly to shared EA space 665 so that call 608*a* may be communicated to application 652N.

Thus, this illustrative embodiment provides for establishing an intra-cluster connection between two data processing systems using robust host fabric interface (HFI) controllers. The HFI in a first data processing system receives a call from an application that is directed to a second data processing system. The HFI uses state information associated with the call to identify the second data processing system and establishes a connection with an HFI of the second data processing system through a set of integrated switch/routers. Once the connection is established, the HFI of the first data processing system is able to transfer data to the second data processing system for use by the second data processing system.

FIG. 7 illustrates a data processing system in which inter-cluster process-to-process communications are performed by a host fabric interface (HFI) in accordance with an illustrative embodiment. With reference to FIG. 7, exemplary data processing system 700 includes, in addition to the elements particular to the illustrative embodiments, elements that are similar to elements depicted in data processing system 600 of FIG. 6. Thus, elements in FIG. 7 that are not specifically described as operating differently from elements in FIG. 6 are intended to operate in a similar manner as their corresponding elements in FIG. 6. For example, data processing system 700 may comprise applications 702*a*, 702*b*, through 702N, operating system 704, and HFI robust controller 706, each of which operate in a similar manner to that described with the corresponding elements in FIG. 6. However, in this illustrative embodiment, HFI robust controller 706 may comprise HFI 722, integrated switch/router (ISR) 724, and network interface controller 728. While the illustrative embodiment depicts HFI robust controller 706 as comprising HFI 722, ISR 724, and network interface controller 728, HFI 722, ISR 724, and network interface controller 728 may be separate components within data processing system 700, such as is shown in FIG. 3 by HFI 338, integrated switch/router 340, and PHYs 334 and 336, which may be initialized as network interface controllers and provide external data flow to a network. Thus, network interface controller 728 provides external data flow to network 730.

HFI 722, ISR 724, and network interface controller 728 act as a gateway to other inter-cluster devices, such as data processing system 750. HFI 722 uses a state program to identify inter-cluster devices associated with call 708*a* and accesses inter-cluster devices using derived state information. The state information stored by HFI 722 may particularly identify whether the intended device is connected to HFI robust controller 722 through a direct attached intra-cluster as is illustrated in FIG. 6 or the network attached inter-cluster which is described in FIG. 7. Using HFI 722 to identify state information associated with inter-cluster devices, such as data processing system 750, instead of operating system 704 performing the identification process, increases the speed and efficiency of data processing system 700.

When application 702*a* initiates call 708*a* to communicate with graphics adapter 766, operating system 704 allocates network communications buffer 726 to store the information to be communicated to graphics adapter 766 and passes call 708*a* directly to HFI robust controller 706. HFI robust controller 706 identifies data processing system 750 as the data processing system that comprises graphics adapter 766. HFI 722 then initiates a connection to data processing system 750 through ISR 724 and network interface controller 728 via network 730 to network interface controller 778, ISR 774, and onto HFI 772. Once the HFI-to-HFI connection from HFI 722 to HFI 772 is established, HFI 722 transfers call 708*a* and the data from network communications buffer 726 to EA display buffer 770 so that call 708*a* may be executed by operating system 754 and the information may be displayed directly on graphics adapter 766. That is, the data associated with call 708*a* is displayed directly on graphics adapter 766 without any assistance from any application running on data processing system 750.

For example, if application 702*a* on data processing system 700 is an instant messaging application and a user wants to display a message on data processing system 750, current system would require the same instant messaging application to be running on data processing system 750. However, the illustrative embodiment does not require that the same instant messaging system be running on data processing system 750. In fact, as an example, data processing system 750 does not have any instant messaging applications whatsoever. Nonetheless, the illustrative embodiment allows HFI 722 to establish a connection to data processing system 750 through ISR 724 and network interface controller 728 via network 730 to network interface controller 778, ISR 774, and onto HFI 772. Once the HFI-to-HFI connection from HFI 722 to HFI 772 is established, HFI 722 transfers call 708*a* and the data, in this example an instant message, from network communications buffer 726 to EA display buffer 770 so that call 708*a* may be executed by operating system 754 and the instant message is displayed directly on graphics adapter 766 without any assistance from any application running on data processing system 750.

Further, similar to the process described in FIG. 6, if application 702a in data processing system 700 initiates call 708a to communicate with application 752N in data processing system 750, operating system 704 passes call 708a directly to HFI robust controller 706 without any processing of call 708a by operating system 704. Operating in a similar process to communicating with graphics adapter 766, HFI robust controller 706 identifies data processing system 750 as the data processing system that comprises application 752N and initiates a connection to data processing system 750 through ISR 724 and network interface controller 728 via network 730 to network interface controller 778, ISR 774, and onto HFI 772. At this point, HFI 772 in HFI robust controller 756 registers shared EA space 765 with operating system 754 with which to communicate with application 752N. Based on the registration request, operating system 754 allocates shared EA space 765 without any involvement by application 752N. This process is different from generally known application to application processes. That is, in generally known application to application processes, if application 702a wants to communicate with application 752N in a different data processing system, operating system 754 would require permission from application 752N prior to allocating shared EA space 765. However, in this illustrative embodiment, once the HFI-to-HFI connection from HFI 722 to HFI 772 is established, operating system 754 allocates shared EA space 765 without permission from application 752N and HFI 722 transfers call 708a and the data stored in network communications buffer 726 directly to shared EA space 765 so that call 708a may be communicated to application 752N.

Thus, this illustrative embodiment provides for establishing an inter-cluster connection between two data processing systems using robust host fabric interface (HFI) controllers. The HFI in a first data processing system receives a call from an application that is directed to a second data processing system. The HFI uses state information associated with the call to identify the second data processing system and establishes a connection with an HFI of the second data processing system through a set of integrated switch/routers, network interface controllers, and a network. Once the connection is established, the HFI of the first data processing system is able to transfer data to the second data processing system for use by the second data processing system.

FIG. 8 depicts the operation performed by a host fabric interface (HFI) robust controller in accordance with an illustrative embodiment. As the operation beings, a first HFI in a first HFI robust controller in a first data processing system receives a call from a first application in the first data processing system (step 802). The first HFI identifies a second data processing system that is associated with the call (step 804). The first HFI uses a state program to identify an intra-cluster or an inter-cluster data processing system associated with the call so that the intra-cluster or inter-cluster data processing system may be accessed using derived state information. The state information stored by the first HFI may particularly identify whether the second data processing system is connected to the HFI robust controller through a direct attached intra-cluster or a network attached inter-cluster (step 806).

If at step 806 the second data processing system is connected through a direct attached intra-cluster, the HFI robust controller establishes a connection from the first data processing system to the second data processing system via a set of integrated switch/routers and a second HFI (step 808). Then the HFI transfers the call and data associated with the call to the second data processing system so that the call may be executed by an operating system in the second data processing system without assistance from any application running on the second data processing system (step 810), with the operation ending thereafter.

If at step 806 the second data processing system is connected through a network attached inter-cluster, then the HFI establishes a connection from the first data processing system to the second data processing system via a set of integrated switch/routers, a set of network interface controllers, a network, and a second HFI (step 812). Then the HFI transfers the call and data associated with the call to the second data processing system so that the call may be executed by an operating system in the second data processing system without assistance from any application running on the second data processing system (step 814), with the operating ending thereafter.

Thus, the illustrative embodiments provide for establishing an intra-cluster or inter-cluster connection between two data processing systems using robust host fabric interface (HFI) controllers. The HFI in a first data processing system receives a call from an application that is directed to a second data processing system. The HFI uses state information associated with the call to identify the second data processing system as either a direct attached intra-cluster or a network attached inter-cluster and establishes a connection with an HFI of the second data processing system through a set of integrated switch/routers and another HFI, or a set of integrated switch/routers, network interface controllers, a network, and another HFI. Once the connection is established, the HFI of the first data processing system is able to transfer data to the second data processing system for use by the second data processing system.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a plurality of data processing systems, for managing an application communication request, the method comprising:
   receiving a call in a first operating system from a first application in a first data processing system in the plurality of data processing systems intended for a second application in a second data processing system;
   passing, by the first operating system, the call from the first operating system to a first host fabric interface controller in the first data processing system without processing the call;
   processing the call, by the first host fabric interface controller, using state information associated with the call to determine the second data processing system in the plurality of data processing systems with which the call is associated, wherein the call is processed by the first host fabric interface controller without intervention by the first operating system;
   initiating, by the first host fabric interface controller, a connection to a second host fabric interface controller in the second data processing system;
   responsive to the first host fabric interface initiating the connection to the second host fabric interface in the second data processing system, registering, by the second host fabric interface controller, effective address space with the second operating system in the second data processing system without involvement by the second application, wherein the second host fabric interface controller registers the effective address space with the second operating system without permission from the second application;
   transferring, by the first host fabric interface controller, data associated with the call from a network communications buffer in the first data processing system to the effective address space in the second data processing system via the connection to the second host fabric interface controller; and
   processing, by the second operating system, the call intended for the second application without assistance from the second application residing in the second data processing system utilizing the data in the effective address space in the second data processing system, wherein the first application is a same type of application as the second application and wherein the second data processing system is executing at least one other application.

2. The method of claim 1, wherein the first host fabric interface controller uses a state program to identify the second data processing system to which the call is directed.

3. The method of claim 1, further comprising:
   responsive to receiving the call, allocating, by the first operating system, the network communications buffer in the first data processing system.

4. The method of claim 1, wherein the call is a request to communicate with the second application coupled to the second data processing system and wherein the second operating system in the second data processing system allocates a shared buffer in the second data processing system in response to the request without any involvement by the second application.

5. The method of claim 4, further comprising:
   transferring, by the first host fabric interface controller, data associated with the call from a network communications buffer in the first data processing system to the shared buffer in the second data processing system.

6. The method of claim 5, further comprising:
   processing, by the second operating system, the call suck that the data in the shared buffer is communicated to the second application coupled to the second data processing system.

7. An apparatus, comprising:
   a processor; and
   a memory coupled to the processor, wherein the memory comprises instructions which, when executed by the processor, cause the processor to;
   receive a call in a first operating system from a first application in a bust data processing system in a plurality of data processing systems intended for a second application in a second data processing system;
   pass, by the first operating system, the call from the first operating system to a first host fabric interface controller in the first data processing system without processing the call;
   process the call, by the first host fabric interface controller, using state information associated with the call to determine the second data processing system in the plurality of data processing systems with which the call is associated, wherein the call is processed by the first host fabric interface controller without intervention by the first operating system;
   initiate, by the first host fabric interface controller, a connection to a second host fabric interface controller in the second data processing system;
   responsive to the first host fabric interface initiating the connection to the second host fabric interface in the second data processing system, register, by the second host fabric interface controller, effective address space with the second operating system in the second data processing system without involvement by the second application, wherein the second host fabric interface controller registers the effective address space with the second operating system without permission from the second application;
   transfer, by the first host fabric interface controller, data associated with the call from a network communications buffer in the first data processing system to the effective address space in the second data processing system via the connection to the second host fabric interface controller; and process, by the second operating system, the call intended for the second application without assistance from the second application residing in the second data processing system utilizing the data in the effective address space in the second data processing system, wherein the first application is a same type of application as the second application and wherein the second data processing system is executing at least one other application.

8. The apparatus of claim 7, wherein the first host fabric interface controller uses a state program to identify the second data processing system to which the call is directed.

9. The apparatus of claim 7, wherein the instructions further cause the processor to:
responsive to receiving the call, allocate, by the first operating system, the network communications buffer in the first data processing system.

10. The apparatus of claim 7, wherein the call is a request to communicate with the second application coupled to the second data processing system and wherein the second operating system in the second data processing system allocates a shared buffer in the second data processing system in response to the request without any involvement by the second application.

11. The apparatus of claim 10, wherein the instructions further cause the processor to:
transfer, by the first host fabric interface controller, data associated with the call from a network communications buffer in the first data processing system to the shared buffer in the second data processing system; and
process, by the second operating system, the call such that the data in the shared buffer is communicated to the second application coupled to the second data processing system.

12. A computer program product comprising a non-transitory computer recordable medium hawing a computer readable program recorded thereon, wherein the computer readable program, when executed on a computing device, causes the computing device to:
receive a call in a first operating system from a first application in a first data processing system in a purality of data processing systems intended for a second application in a second data processing system;
pass, by the first operating system, the call from the first operating system to a first host fabric interface controller in the first data processing system without processing the call;
process the call, by the first host fabric interface controller, using state information associated with the call to determine the second data processing system in the plurality of data processing systems with which the call is associated, wherein the call is processed by the first host fabric interface controller without intervention by the first operating system;
responsive to the first host fabric interface initiating the connection to the second host fabric interface in the second data processing system, register, by the second host fabric interface controller, effective address space with the second operating system in the second data processing system without involvement by the second a application, wherein the second host fabric interface controller registers the effective address space with the second operating system without permission from the second application;
transfer, by the first fabric interface controller, data associated with the call from a network communication buffer in the first data processing system to the effective address space in the second data processing system via the connection to the second host fabric interface controller; and
process, by the second operating system, the call intended for the second application without assistance from the second application residing in the second data processing system utilizing the data in the effective address space in the second data processing system, wherein the first application is a same type of application as the second application and wherein the second data processing system is executing at least one other application.

13. The computer program product of claim 12, wherein the first host fabric interface controller uses a state program to identity the second data processing system to which the call is directed.

14. The computer program product of claim 12, wherein the computer readable program further causes the computing device to:
responsive to receiving the call, allocate, by the first operating system, the network communications buffer in the first data processing system.

15. The computer program product of claim 12, wherein the call is a request to communicate with the second application coupled to the second data processing system and wherein the second operating system in the second data processing system allocates a shared buffer in the second data processing system in response to the request without any involvement by the second application.

16. The computer program product of claim 15, wherein the computer readable program further causes the computing device to:
transfer, by the first host fabric interface controller, data associated with the call from a network communications buffer in the first data processing system to the shared buffer in the second data processing system.

17. The computer program product of claim 16, wherein the computer readable program further causes the computing device to:
process, by the second operating system, the call such that the data in the shared buffer is communicated to the second application coupled to the second data processing system.

* * * * *